US008146481B2

(12) United States Patent
Hoshino et al.

(10) Patent No.: US 8,146,481 B2
(45) Date of Patent: Apr. 3, 2012

(54) ACTUATOR, ACTUATOR CONTROL METHOD, AND ACTUATOR CONTROL PROGRAM

(75) Inventors: Kiyoshi Hoshino, Tsukuba (JP); Don Gayan Krishantha Weragala, Tsukuba (JP)

(73) Assignee: University of Tsukuba, National University Corporation, Ibaraki (JP)

( * ) Notice: Subject to any disclaimer, the term of this patent is extended or adjusted under 35 U.S.C. 154(b) by 0 days.

(21) Appl. No.: 12/917,513

(22) Filed: Nov. 2, 2010

(65) Prior Publication Data

US 2011/0120296 A1 May 26, 2011

Related U.S. Application Data

(63) Continuation of application No. PCT/JP2009/058619, filed on May 7, 2009.

(30) Foreign Application Priority Data

May 2, 2008 (JP) ................................ 2008-120785
Aug. 7, 2008 (JP) ................................ 2008-204612

(51) Int. Cl.
*F15B 9/09* (2006.01)
*G05B 19/19* (2006.01)

(52) U.S. Cl. .............................. 91/361; 60/459; 700/56

(58) Field of Classification Search .................... 60/459; 91/361, 364, 459; 700/56
See application file for complete search history.

(56) References Cited

U.S. PATENT DOCUMENTS 5,457,959 A * 10/1995 Langguth et al. ............... 91/361
6,305,264 B1 10/2001 Yang et al.
6,662,705 B2 * 12/2003 Huang et al. .................... 91/459
6,705,199 B2 * 3/2004 Liao et al. .................. 91/363 R
6,799,501 B2 * 10/2004 Yo et al. .......................... 91/361
7,062,832 B2 * 6/2006 Yo et al. ..................... 29/407.08
7,076,314 B2 * 7/2006 Saitou ............................ 700/56
7,210,394 B2 * 5/2007 Yajima et al. .................. 91/361
7,392,734 B2 7/2008 Kawabuchi et al.
(Continued)

FOREIGN PATENT DOCUMENTS

JP 45-39964 B1 12/1970
(Continued)

OTHER PUBLICATIONS

International Search Report for International Application No. PCT/JP2009/058619, Aug. 11, 2009.
(Continued)

*Primary Examiner* — Thomas E Lazo
(74) *Attorney, Agent, or Firm* — Ditthavong Mori & Steiner, P.C.

(57) ABSTRACT

An actuator in which overshooting has been reduced is provided. A cylinder is divided by a piston to provide first and second chambers, and first and second control valves 41, 43, which adjust fluid pressure supply to respective chambers in a non-step manner, and first and second discharge valves 42, 44, which control outflow of fluid from the first and second chambers, are provided. A first control device carries out feedback control of pressure to be supplied to the first or second chamber such that a difference between a target position of the piston and a detected position of the piston becomes smaller. A second control device carries out differential-preceding PD control to bias pressure to be commonly supplied to the first and second chambers such that the difference between the target position of the piston and the detected position of the piston becomes smaller.

10 Claims, 8 Drawing Sheets

U.S. PATENT DOCUMENTS

| | | | | |
|---|---|---|---|---|
| 7,870,817 | B2 * | 1/2011 | Kawabuchi et al. | 60/461 |
| 2006/0037466 | A1 | 2/2006 | Yajima et al. | |

FOREIGN PATENT DOCUMENTS

| | | |
|---|---|---|
| JP | 8-19873 | 1/1996 |
| JP | 9-303307 | 11/1997 |
| JP | 2000-199502 | 7/2000 |
| JP | 2003-311667 | 11/2003 |
| JP | 2006-57724 | 3/2006 |
| JP | 2006-220243 | 8/2006 |
| WO | WO 2005/045257 | 5/2005 |

OTHER PUBLICATIONS

International Preliminary Report for International Application No. PCT/JP2009/058619, Aug. 5, 2010.

* cited by examiner

ACTUATOR, ACTUATOR CONTROL METHOD, AND ACTUATOR CONTROL PROGRAM

TECHNICAL FIELD

The present invention relates to an actuator using a fluid cylinder such as an air cylinder, etc., an actuator control method, and an actuator control program.

BACKGROUND ART

As described in Patent Document 1, conventionally an electric motor such as a servo motor, etc. has been used as an actuator for moving joints of a robot. This is because motors are relatively readily available. However, motors have a problem that the whole robot becomes larger, and also, because they are relatively weighty, design of mechanical strength of a robot becomes important. A fluid cylinder such as an air cylinder, etc. has advantages, as compared with motors, that it is small and light, and being simple in structure, maintenance is easy, so that it is considered that the fluid cylinder is useful for the actuator for a robot.

Patent Document 2 describes an actuator previously proposed by one of the inventors of the present application.

Patent Document 1: Japanese Unexamined Patent Application Publication No. 2003-311667

Patent Document 2: W02005-45257

DISCLOSURE OF THE INVENTION

Problems to be Solved by the Invention

However, as the biggest disadvantage impeding application to an actuator of a fluid cylinder such as an air cylinder, there is a disadvantage that it is difficult to deliver rigidity, i.e., the capability of making it hard for a piston to be moved at an arbitrary position in the cylinder. It is believed that the major cause thereof is that because responsiveness in force generation is relatively weak unlike motors, the force resisting an external force for maintaining the position of a piston cannot be quickly generated. In order to resolve this, a method is available, which adds a friction brake, a latch, etc., however, it is more rational to use only a motor, if a friction brake, a latch, etc. are to be added. Accordingly, a method is necessary, which gives such rigidity by a mechanism which is simple as much as possible. However, so far, technique capable of meeting this need has not been proposed.

To solve this problem, the inventors of the present application have previously proposed an actuator provided with a discharge valve mechanism capable of changing valve opening (Patent Document 2).

If the pressure within an air cylinder is controlled with the provision of the previously proposed discharge valve, as an actuator, desired operation conditions can be obtained.

As the method for controlling such an air cylinder, for example PID control has been widely known. PID control is one kind of feedback control, and is a method of controlling the amount of operation based on three elements, an amount proportional to a difference between a present value and a target value, an amount proportional to time integration of the difference, and an amount proportional to the amount of change of the difference. “P” of PID control stands for proportional control proportional to a difference, “I” stands for integral control, and “D” stands for differential control.

PID control is a control method widely spread not only in control of an air cylinder, but also in carrying out control for making various kinds of control conditions close to target control conditions.

When PID control is applied to control of an air cylinder and a piston in the air cylinder is rapidly moved under control of air pressure within the air cylinder, it is difficult to precisely stop the piston, without passing a target position, in movement of the piston at a high speed. When moving a piston at a high speed under regular PID control, it is commonly practiced to carry out such control as to return the piston to a target position after passing the target position a certain degree. It will be no problem if it stops at a target position by just returning to the target position once, however, in actuality, while overshooting to pass a target position is occurring several times, the amounts of overshooting and returning become gradually smaller, and eventually it stops at the target position.

If such overshooting occurs in control of an air cylinder, even if a piston moves to a vicinity of a target position at a high speed, it comes to that it takes time for the piston to eventually stop at the target position, resulting in unsatisfactory control condition.

The present invention has been made in view of such a point, and aims that control of a fluid actuator such as an air cylinder realizes high responsiveness while reducing overshooting.

Means for Solving Problems

The present invention is applied to an actuator having a piston slidably arranged in a cylinder and dividing the cylinder into a first chamber and a second chamber, and controlling pressures of gaseous or liquid fluids in the first and second chambers to control a position of the piston in a sliding direction.

The actuator includes first and second control valves arranged between a fluid pressure source and the first and second chambers and configured to adjust fluid pressure supply to the first and second chambers in a non-step manner; and first and second discharge valves configured to allow fluid to flow in a discharge direction from the first and second chambers side toward the atmosphere or low pressure source side.

The actuator further includes a first control device and a second control device which control at least either one of the first and second control valves.

The first control device carries out feedback control of pressure to be supplied to the first or second chamber such that a difference between a target position of the piston and a detected position of the piston becomes smaller; and the second control device carries out feedback control of bias pressure to be commonly supplied to the first and second chambers such that the difference between the target position of the piston and the detected position of the piston becomes the smallest.

Effects of the Invention

According to the present invention, so-called PID control is carried out by the first control device, in which a value obtained by multiplying a difference between a target position of a piston and a detected position of the piston with a proportional gain, a value obtained by multiplying time integral of the difference with an integral gain, and a value obtained by multiplying a change amount of the difference with a differential gain are combined. Then, processing for increasing and decreasing bias pressure which is commonly supplied to the first chamber and the second chamber is carried out by the second control device such that the PID control condition by the first control device is corrected. Accordingly, while control for causing the piston to quickly reach a target position based on so-called PID control is carried out, overshooting of the piston can be eliminated by correction of bias pressure, and quick movement of the piston to the target position becomes possible.

BEST MODE FOR CARRYING OUT THE INVENTION

Below, description will be made with respect to an example of an embodiment of the present invention, referring to attached drawings.

In the present embodiment, the present invention has been applied to an air cylinder constituted as an actuator.

Figure 1:
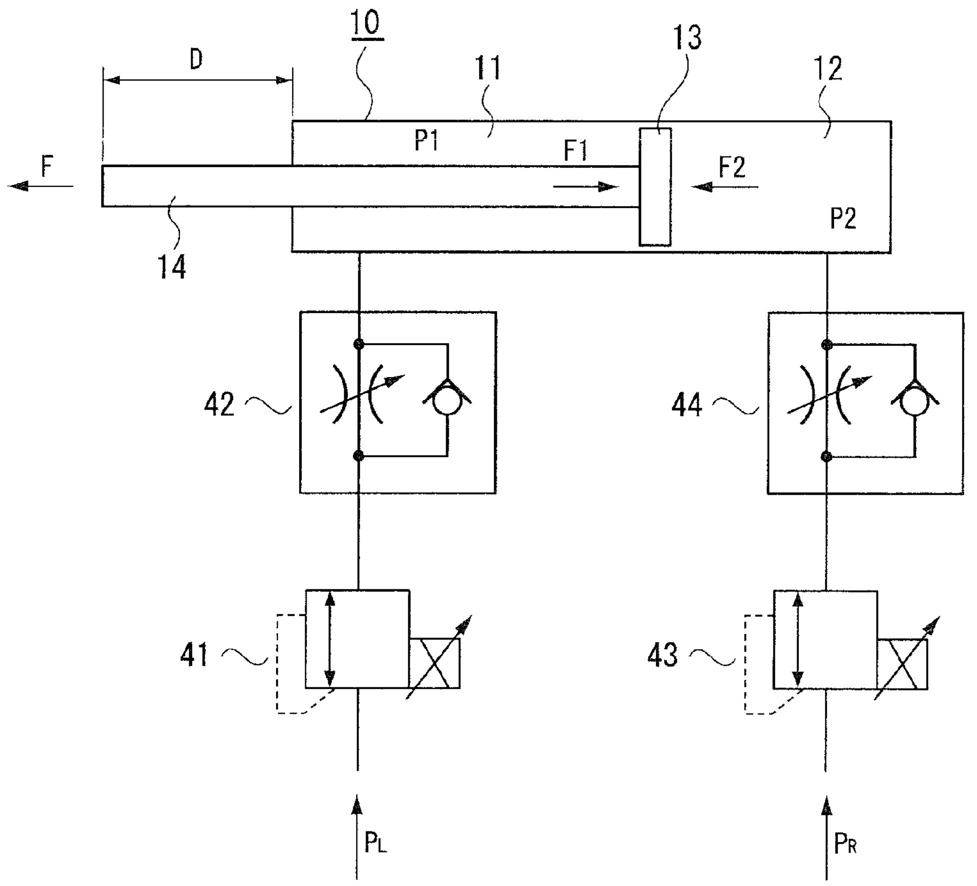
FIG. 1 is an explanatory diagram illustrating an example of basic structure of control condition of an air cylinder according to an embodiment of the present invention.

FIG. 1 illustrates an air cylinder of the present embodiment and an example of structure which conveys compressed air to the air cylinder.

As illustrated in FIG. 1, an air cylinder 10 is a double-acting air cylinder in which a piston 13 is arranged in the cylinder 10 so as to freely slide. The inside of the cylinder 10 is divided into a first chamber 11 and a second chamber 12 by the slidable piston 13.

The piston 13 is provided with a piston rod 14, and in this example, some sort of driving is carried out by the piston rod 14. Here, the driving condition is determined by a protrusion length D of the piston rod 14 from the air cylinder 10.

To the first chamber 11, attached are a first control valve 41, which can adjust supplying of fluid pressure from a fluid pressure source in a non-step manner, and a first discharge valve 42, which allows a free-flow in one direction and a controlled-flow in the opposite direction. To the second chamber 12, attached are a second control valve 43, which can adjust supplying of fluid pressure from a fluid pressure source in a non-step manner, and a second discharge valve 44, which allows a free-flow in one direction and a controlled flow in the opposite direction. Although not illustrated, an air compressor serving as a fluid pressure source is connected to the input side of the first and second control valves 41 and 43, and compressed air from the air compressor is supplied into each of the chambers 11 and 12. With the provision of the first and second control valves 41 and 43 and the first and second discharge valves 42 and 44, air pressure within each of the chambers 11 and 12 is controlled. The control process thereof in the present embodiment will be described later.

Next, description is made with respect to conditions that pressure within the air cylinder 10 is controlled by control valves and discharge valves illustrated in FIG. 1.

First, before explaining the control process in an embodiment of the present invention, a common control process using the first and second discharge valves 42 and 44 in the double-acting air cylinder 10 with the constitution as illustrated in FIG. 1 is described. Three types are available for the first and second discharge valves 42 and 44, the one in which the throttle is fixed, the one in which the throttle is mechanically adjusted, and the one in which the exhaust amount is manually adjusted. The discharge valve also called a speed controller, which manually adjusts the exhaust amount, has a finger grip, and by rotating the finger grip, an air flow path is narrowed and broadened. If the flow path is narrowed, the flow rate of air discharged from the cylinder 10 decreases. As a result, the speed the piston 13 advances in the cylinder is reduced. The following relation is satisfied between the outflow rate of air and the speed of the piston.

[Mathematical Expression 1]

$$V = \frac{Q}{60 * A} \quad (1)$$

Here, V expresses a moving speed of the piston (cm/s), Q expresses an outflow rate of air ($cm^3$/min), and A expresses a cross-section area of the cylinder ($cm^2$).

From Expression (1), it is understood that if the outflow rate of air increases, i.e., if the discharge opening of the speed controller increases, the moving speed of the piston increases.

Here, in the cylinder illustrated in FIG. 1, as illustrated in figure, when F is a generative force, F1 and F2 are generative forces in respective chambers, P1 and P2 are air pressures in respective chambers, and D is a displacement, the following two expressions are true.

[Mathematical Expression 2]

$$F = F_1 - F_2 \propto P_1 - P_2 \quad (2)$$

[Mathematical Expression 3]

$$\frac{\partial F}{\partial D} = 0 \quad (3)$$

That is, in the double-acting air cylinder with the discharge opening released, passive rigidity becomes zero, i.e., $\partial F/\partial D=0$, so that if the capability of making it hard for a piston to be moved at an arbitrary position in the cylinder, i.e., rigidity, is to be delivered, by finely changing the exhaust air flow path, a receptive drag must be generated by control of flow resistance (dumper effect) of exhaust air.

Now, if target air pressures, which will be necessary in two chambers on the thrusting side and the resisting side, respectively, are considered with respect to four conditions in total, i.e., how fast or slow the desired moving speed of the piston is and how high or low the rigidity is, when the target air pressure is relatively high the trend is to obtain higher rigidity, and conversely when the target air pressure is relatively low, the trend is to obtain lower rigidity. That is, if it is intended to obtain higher rigidity, it is only necessary to increase the target air pressure on both the thrusting side and the resisting side. Namely, it is only necessary that the discharge opening is narrowed in response to the height of a target air pressure. From this, it leads to that it is only necessary to set the valve opening such that the target air pressure and the discharge valve opening are relatively in a reverse proportional relation.

In the present embodiment, based on the above-described theoretical consideration, control of the protrusion length D of the piston rod 14 with the first and second control valves 41 and 43 and the first and second discharge valves 42 and 44 illustrated in FIG. 1 is carried out.

In the constitution by the first and second control valves 41 and 43 and the first and second discharge valves 42 and 44 illustrated in FIG. 1, in order to cause air of high pressure to flow into the air cylinder in high volume to drive the piston at a high speed, the first and second control valves 41 and 43 allowing only inflow of air are provided. With the combination of the first and second control valves 41 and 43 for air supply and the first and second discharge valves 42 and 44 for air exhaust, it is constituted such that common bias pressure control is possible.

Next, a control system of the protrusion length D of the piston rod 14 is described.

As the control system of an air cylinder, besides PID control described in Background Art, I-PD control (proportional control and differential control preceding PID control), which is an expansion of PID control, etc. have been known. I-PD control is expressed by a model of the following expression.

[Mathematical Expression 4]

$$u(t) = -Kpy(t) + Ki\int_0^t e(t)d\tau - Kd\frac{dy(t)}{dt} \tag{4}$$

In Expression (4), u(t) is an operation amount, y(t) is a control amount (present value), e(t) is a difference, Kp is a proportional gain, Ki is an integral gain, and Kd is a differential gain. In I-PD control, only the integral term is caused to act on the difference, and the proportional term and the differential term are caused to act on the control amount. Thereby, it is possible to suppress an unnecessary change of the operation amount by the differential component when target values have been given in a stepped manner, and also satisfactory convergence of overshooting can be obtained. On the other hand, because the effect of the integral term is strong, the fast following capability which is an advantage of the pneumatic actuator becomes hard to be demonstrated. In one experiment example, it sometimes occur that the rising time, i.e., the time that the air pressure changes from 10% to 90% of a target value, is one second or more.

Here, in the present embodiment, PID control in which the rising time is relatively short has been used, and further, it has been intended to solve problems in carrying out PID control.

In PID control, avoiding disturbance and following a target value at a high speed are possible without providing a complicated control system, implementation is easy, and field adjustment is also easy, so that PID control is adopted in 90% or more of mechanical apparatus in industry.

PID control is expressed by a model of the following expression.

[Mathematical Expression 5]

$$u(t) = Kpe(t) + Ki\int_0^t e(t)dt + Kd\frac{de(t)}{dt} \tag{5}$$

Here, u(t) is an operation amount, e(t) is a difference, Kp is a proportional gain, Ki is an integral gain, and Kd is a differential gain. However, when carrying out PID control using an air cylinder, because the air cylinder itself has high responsiveness, if position control of a piston is going to be carried out at a high speed, as the responsive speed is higher, it results in occurrence of large overshooting of the piston. Also, as the degree of freedom to be controlled increases, controllability thereof deteriorates, so that precise control of multiple degrees of freedom at a high speed is difficult using PID control.

Here in the present embodiment, the air cylinder illustrated in FIG. 1 and control devices of the air pressure to be conveyed to the air cylinder are constituted, and pressures to be given to the two chambers 11 and 12 are controlled, and thereby overshooting of a piston occurring due to PID control is improved, and precise position control and quick responsiveness of the piston are realized.

Below, describing control conditions in the present embodiment, with respect to target pressures $P_0$ and $P_1$ to the two chambers, if a pressure difference between the two chambers 11 and 12 on the thrusting side and the resisting side is P', it is possible to control an equal pressure Pbias (bias pressure) to be given to the two chambers, also. The bias pressure is expressed as the following expression.

[Mathematical Expression 6]

$$P_{bias} = P_0 - P' = P_1 \tag{6}$$

In this regard, however, P'=P0−P1, P0≧P1.

Precise position control and quick responsiveness of the piston are realized using the bias pressure control also.

Figure 2:
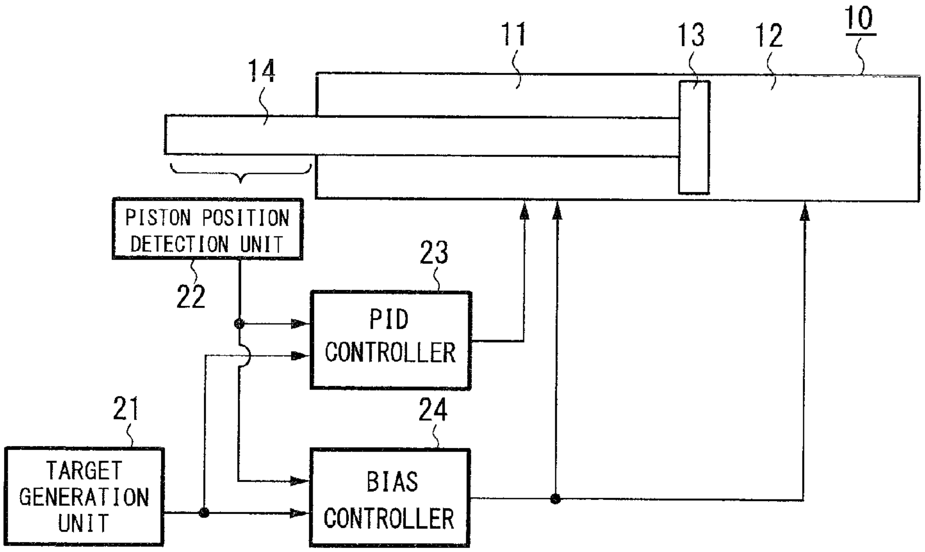
FIG. 2 is an explanatory diagram illustrating an example of control constitution according to the first embodiment of the present invention.

FIG. 2 is a diagram illustrating an example of control constitution of the present embodiment.

The example of control constitution of FIG. 2 is an example in which the side of the first chamber 11 is the thrusting side and the side of the chamber 12 is the resisting side, that is, an example in which the piston 13 is moved toward right in FIG. 2. When the direction in which the piston 13 is moved is reverse, connection to the first chamber side and connection to the second chamber side are reversed.

Pressures of air within the chambers 11 and 12 of the air cylinder 10 are controlled by the first and second control valves 41 and 43 and the first and second discharge valves 42 and 44 illustrated in FIG. 1. As control devices carrying out such control, a bias controller 24 (second control device) carrying out control of giving bias pressure, and a PID controller 23 (first control device) carrying out PID control are provided.

The controllers 23 and 24 are supplied with data of target positions of a piston given from a target generation unit 21, and data of actual positions of the piston detected by a piston position detection unit 22.

Then, supplying of fluid pressure from the first control valve 41 on the side of the first chamber 11 is controlled such that the value of pressure given to the first chamber 11 becomes the sum of pressure values obtained at the controllers 23 and 24.

On the side of the second chamber 12, supplying of fluid pressure from the second control valve 43 is controlled such that the value of pressure given to the second chamber 12 becomes the pressure value obtained at the bias controller 24.

Figure 3:
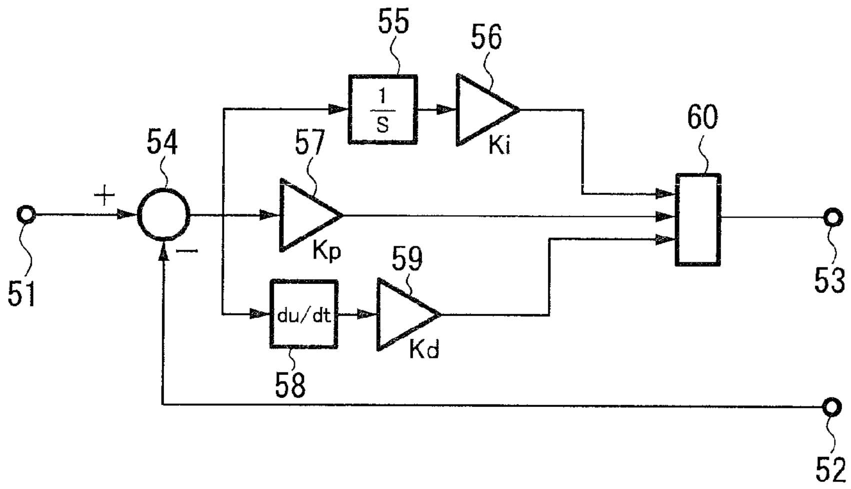
FIG. 3 is a block diagram illustrating an example of a PID controller according to the first embodiment of the present invention.

FIG. 3 is a diagram illustrating an example of constitution of the PID controller 23.

The PID controller 23 is a controller for carrying out PID control, and the pressure to be given by the PID controller 23 is determined based on above-described Expression (5), which is a pressure calculating formula of PID control.

A target value (target position of the piston) is given to a target value input unit 51 from the target generation unit 21, and a detection value of a piston position detected by the piston position detection unit 22 is given to a detection value input unit 52, and a difference of two values is detected by a subtractor 54.

Then, the value of the difference detected by the subtractor 54 is integrated by an integrator 55, and an integral value thereof is multiplied by an integral gain Ki at an integral gain multiplier 56.

Also, the value of the difference detected by the subtractor 54 is supplied to a proportional gain multiplier 57, and is multiplied by a proportional gain Kp.

Further, the value of the difference detected by the subtractor 54 is differentiated by a differentiator 58, and a differential value thereof is supplied to a differential gain multiplier 59 and is multiplied by a differential gain Kd.

An output of the integral gain multiplier 56, an output of the proportional gain multiplier 57, and an output of the differential gain multiplier 59 are supplied to an adder 60 to be added together to be a control value of a single system, and the control value is outputted from a control value output unit 53.

Figure 4:
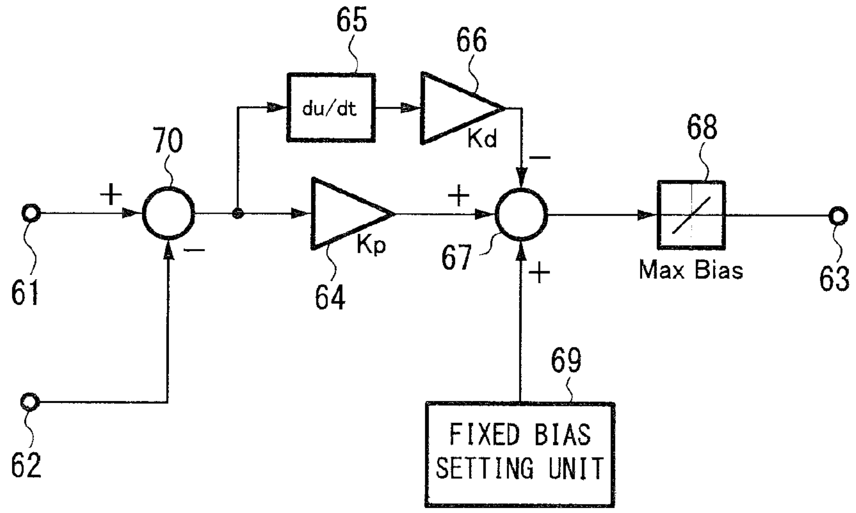
FIG. 4 is a block diagram illustrating an example of a bias controller according to the first embodiment of the present invention.

FIG. 4 is a diagram illustrating an example of constitution of the bias controller 24.

In the bias controller 24, a target value (a target position of the piston) is given to a target value input unit 61 from the target generation unit 21, a detection value of a piston position detected by the piston position detection unit 22 is given to a detection value input unit 62, and a difference of two values is detected by a subtractor 70.

Then, the value of the difference detected by the subtractor 70 is differentiated by a differentiator 65, and a differential value thereof is supplied to a differential gain multiplier 66 and is multiplied by the differential gain Kd.

Also, the value of the difference detected by the subtractor 70 is supplied to a proportional gain multiplier 64 and is multiplied by the proportional gain Kp.

An output of the differential gain multiplier 66 and an output of the proportional gain multiplier 64 are supplied to an adder 67, respectively.

Also, the bias controller 24 includes a fixed bias setting unit 69. The fixed bias setting unit 69 sets a criterion bias pressure value. The criterion bias pressure value set by the fixed bias setting unit 69 is also supplied to the adder 67.

At the adder 67, an output value of the proportional gain multiplier 64 is added to the criterion bias pressure value, and an output of the differential gain multiplier 66 is subtracted.

An output of the adder 67 is supplied to a maximum bias setting unit 68 and is adjusted to be a control value for pressure limited to maximum bias pressure the air compressor connected to the control valves 41, 43 can supply or below, and the adjusted control value is outputted from a control value output unit 63.

Then, control of the control valve 41 or 43 of FIG. 1 is carried out such that the value of pressure given to the first chamber 11 or second chamber 12 becomes a control value (pressure value) in which the control value outputted from the control value output unit 53 of FIG. 3 and the control value outputted from the control value output unit 63 of FIG. 4 has been added.

To describe control conditions in each of the controllers 23 and 24, the PID controller 23 is a controller for carrying out PID control, in which values obtained by individually multiplying a distance difference between a target position and a detected position of the piston in a sliding direction with a proportional gain, an integral gain, and a differential gain have been added together, and control processing using a resulting value is carried out. That is, the pressure to be given is determined based on above-described Expression (5), which is a pressure calculating formula of PID control.

On the other hand, bias pressure control is expressed by the following expression.

[Mathematical Expression 7]

$$P_{bias} = P_{standard} + \left\{ K_1 (x_{target} - x_t) + K_2 \frac{dx_t}{dt} \right\} \tag{7}$$

Here, Pbias is bias pressure, Pstandard is criterion bias pressure, xtarget is a target position, xt is a current position, K1 is a proportional gain of bias pressure, and K2 is a differential gain of bias pressure.

In the present embodiment, with respect to bias pressure, unlike PID control, the integral gain is not used. This is because that if an integral gain is used, there are problems that it immediately exceeds limits of supply pressure of an air compressor, resetting of an integral value is necessary, and three kinds of parameter adjusting are necessary, and that even when an integral gain is adopted, a noticeable improvement cannot be seen in responsiveness of the piston.

In the present embodiment, the criterion bias pressure Pstandard which is set by the fixed bias setting unit 69 was set to 2 atm (atmospheric pressure). The value of the criterion bias pressure is preferably the one that can use bias pressure having a larger dynamic range as possible, within an upper limit of the air pressure the air compressor can supply. In this regard, however, it is not necessary to set the value so strictly.

When estimating respective control gains (proportional gain, integral gain, differential gain), there are a method of determining an optimum gain based on behaviors and values when a control target has been actually moved, and a method of theoretically deriving an estimate value. In the former method, because movement of a control target is hard to be predicted, there is a fear that a large load is given to robot arms, etc. However, in new mechanical apparatus in which nonlinearity is great and modeling is not easy, the method of theoretically obtaining an estimate value like the latter method cannot be always used.

Therefore, a method of making determination in two steps is applied, for example, determining the control gains in the PID controller 23 by the latter method and the control gains in the bias controller 24 by the former method. Such a method is illustrated as follows as Steps 1 through 4.

Step 1: A proportional gain Kp, an integral gain Ki, and a differential gain Kd in the PID controller are estimated. At this time, estimation is made, for example, based on processing described as the Kitamori's method in a literature (S. Shin and T. Kitamori, "Model reference learning control for discrete-time nonlinear systems", Adaptive Systems in Control and Signal Processing 1989, PergamonPress, pp. 101-106, 1990), etc. When making the estimation, a gain value enabling high piston responsiveness, such as the one causing overshooting, is selected for stepwise inputting of each gain value of PID control.

Step 2: Initial values for the proportional gain K1 and the differential gain K2 of the bias pressure in the bias controller are set as K1=1 and K2=0.01. In this regard, however, the proportional gain K1 may be started with a value smaller than 1, because K1 is gradually increased from the next step. On the other hand, the initial value for K2 is set to about 1/100 of K1.

Step 3: The proportional gain K1 in the bias controller is gradually increased, and K1 is increased to the point that the size of overshooting will not change.

Step 4: The differential gain K2 in the bias controller is increased or decreased while observing conditions of overshooting. If the differential gain K2 is increased, overshooting continues, and it will not converge. Conversely, if the differential gain K2 is decreased, overshooting will not occur, however, the piston responsiveness will be almost determined by the proportional gain K1. That is, response rapidity will not be demonstrated. To achieve high responsiveness, some overshooting is necessary, so that the differential gain K2 is made somewhat larger.

Load dynamics of the air cylinder controlled as described above can be expressed by the following equation of motion.

[Mathematical Expression 8]

$$m\frac{d^2 y}{dt^2} = A_1(P_1 + P_{bias}) - A_2(P_2 + P_{bias}) - K_v\frac{dy}{dt} - K_r\mathrm{sgn}\left(\frac{dy}{dt}\right) \quad (8)$$

Here, "m" is a load, A1 a cross-section area of the side of a cylinder where a piston rod is present, A2 is a cross-section area of the side of the cylinder where the piston rod is not present, P1 is pressure of the side of the cylinder where the piston rod is present, P2 is a pressure of the side of the cylinder where the piston rod is not present, Pbias is bias pressure, Kv is a viscous friction coefficient of movable parts, and Kr is a coulomb friction force.

Next, physical characteristics of a control valve or a combination of a control valve and a discharge valve are considered. In the right side of Equation (8), it is assumed that a force based on a pressure difference A1(P1+Pbias)−A2(P2+Pbias), which will be a generative force, is generated when time t=0. However, in actuality, because of the capability of a control valve controlling the pressures (P1, P2, Pbias), it takes time for a pressure response. That is, it will not instantly reach a target pressure as assumed in Expression (8). According to a measurement result, the time lag is for example about 150 ms. To control air pressures in an air cylinder at a high speed, it becomes necessary to take this time lag into consideration.

If the pressure on the pressure supplying side supplying pressure to a control valve, that is, the pressure of an air compressor, is constant, the flow speed Mi of air from the control valve is proportional to a voltage vi instructing the ratio of opening of the control valve to the control valve. Here, i=1, 2, expressing the thrusting side or the resisting side.

And, the pressure change dPi/dt in a chamber can be expressed as the following expression.

[Mathematical Expression 9]

$$\frac{dP_i}{dt} = k_{1i}M_i \quad (9)$$

Here, k1*i* is a proportional constant, and i=1, 2. Also, because the voltage vi is also proportional to a difference between target pressure and present pressure, the following expression is also satisfied.

[Mathematical Expression 10]

$$v_i = k_{2i}(P_{targeti} - P_{currenti}) \quad (10)$$

Here, "Ptarget i" is target pressure for the i-th chamber, "Pcurrent i" is present pressure of the i-th chamber, and k2*i* is a proportional constant.

By pulling together Expression (9) and Expression (10), the following expression is derived.

[Mathematical Expression 11]

$$\frac{dP_i}{dt} = K_i(P_{target\,i} - P_{current\,i}) \quad (11)$$

Here, Ki is a proportional constant.

Figure 5:
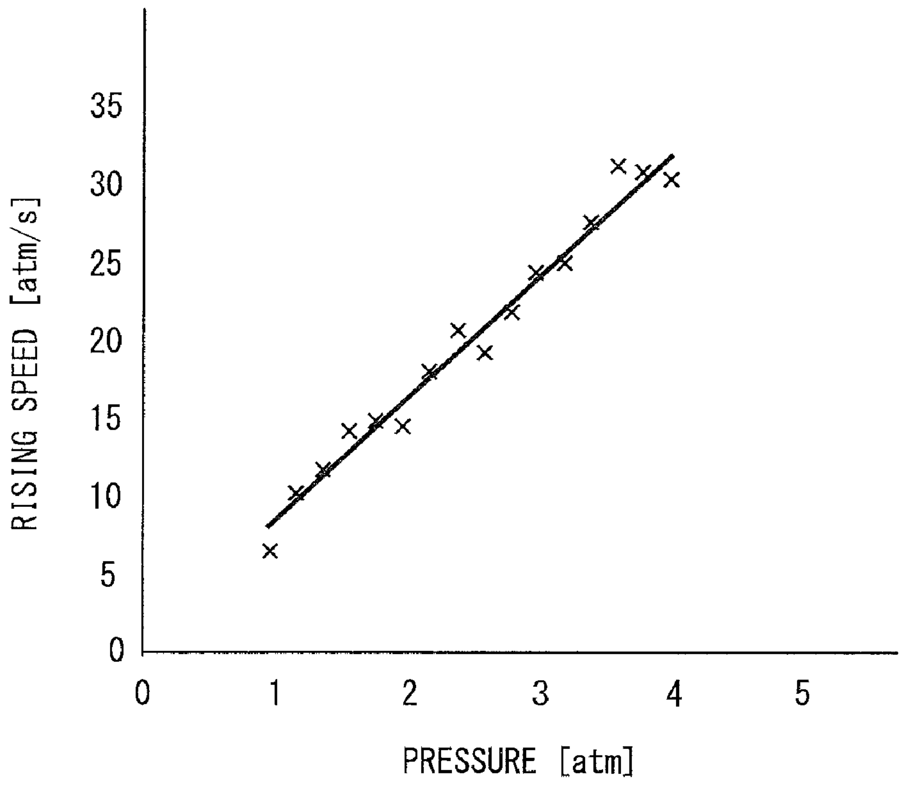
FIG. 5 is a characteristic diagram illustrating an example of pressure change condition according to the first embodiment of the present invention.

FIG. 5 is a diagram illustrating a result of measuring the rising speed when bias pressure is changed from 1 atm up to 4 atm for obtaining the proportional constant Ki in Expression (11). Here, a pressure difference (P'=P1−P2) in the two chambers is set to 0.5 atm. The rising speed on the vertical axis of FIG. 5 is a value obtained by dividing pressures from 10% to 90% of a target value with the time required for such change. Because it is allowed to approximate the result obtained from FIG. 5 by a linear regression equation, it becomes possible to rewrite Expression (11) as the following expression.

[Mathematical Expression 12]

$$\frac{dP_i}{dt} = K_i(\alpha P_b + \beta)(P_{target\,i} - P_{current\,i}) \quad (12)$$

Based on Expression (12), as a result of applying a least square method, α=8.103, β=0.279 were obtained. The physical characteristics of the control valve have been thus determined, and thereby a satisfactory result is obtained.

Figure 6:
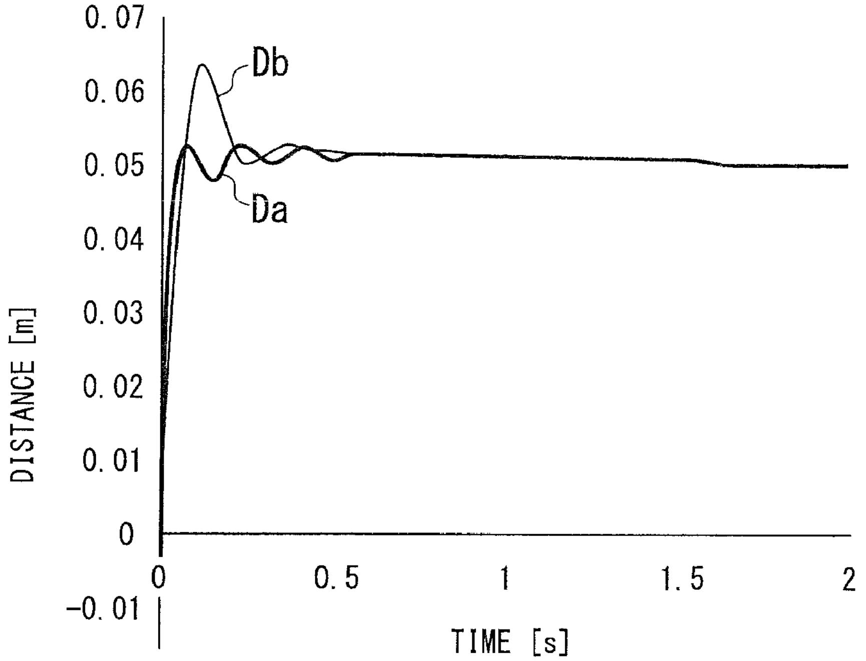
FIG. 6 is a characteristic diagram illustrating an example of control condition according to the first embodiment of the present invention.
Figure 7:
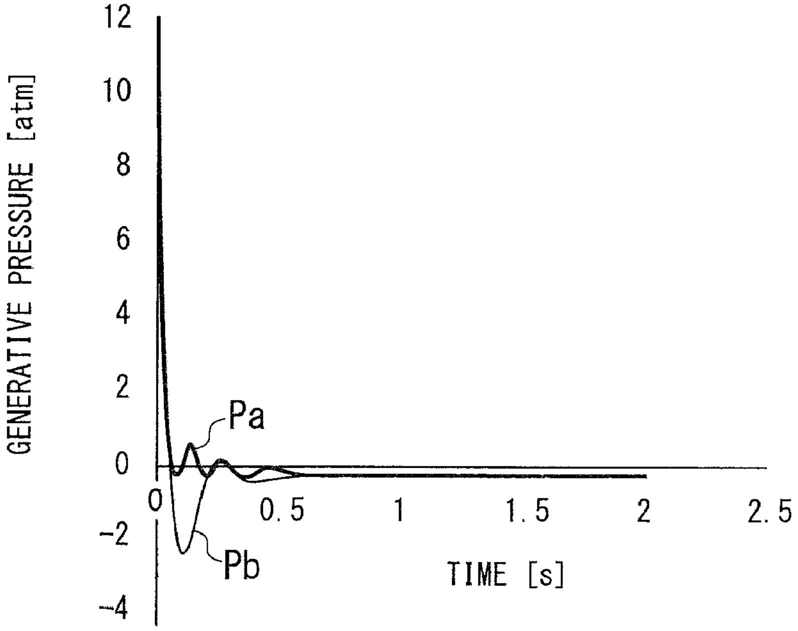
FIG. 7 is a characteristic diagram illustrating an example of control condition when viewed from the viewpoint of generative pressure according to the first embodiment of the present invention.

Based on processing of the present embodiment, an exemplary system was constituted by an air cylinder, air pressure control devices (PID controller, bias controller), and control valves, and a simulation was carried out, and description thereof is now made referring to FIG. 6 and FIG. 7. Here, as a model, Expression (8) showing load dynamics and Expression (11) showing physical characteristics of the control valve were used. The load was 200 g, and the movable range of the piston was set to 0-10 cm.

FIG. 6 shows piston response characteristics Da when the PID controller and the bias controller of the present embodiment were both used, and piston response characteristics Db when only the PID controller corresponding to a conventional example was used. The target value for the piston position (protrusion length D of the piston) was 5 cm.

While overshooting was about 20% of the target value (5 cm) for the piston position (protrusion length D of the piston) when only the PID controller was used, when the PID controller and the bias controller were concurrently used, overshooting was considerably suppressed up to 4% of the target value (5 cm).

FIG. 7 illustrates characteristics Pa of a change overtime of a generative force when the PID controller and the bias controller according to the present embodiment were concurrently used, and characteristics Pb of a change overtime of a generative pressure when only the PID controller was used, which corresponds to a conventional example. As understood if compared with the characteristics Pb when only the PID controller was used, in the case of the characteristics Pa of the present embodiment, a trend is recognized that an unnecessary pressure is not generated, and this is presumed as a cause that overshooting can be suppressed extremely less while realizing a fast initial rise comparable with the case of carrying out only PID control.

As understood from the description above, according to the present embodiment, there is an advantage that while realizing a quick rising time comparable with the case of carrying out only PID control, overshooting can be drastically suppressed.

The air cylinder has many advantages when compared with a motor, such as being simple in structure, easy in maintenance, small and light, and capable of generating a relatively large force. However, because it uses air, i.e., fluid which is compressible, precise speed control and position control of the piston are not easy. Also, there are disadvantages that it is easily influenced by a load, that is, it is hard to demonstrate the capability of making it hard for a piston to be moved at an arbitrary position, i.e., rigidity, and so on, however, an air cylinder in which these problems are solved is realized with the processing constitution of the present embodiment.

Figure 8:
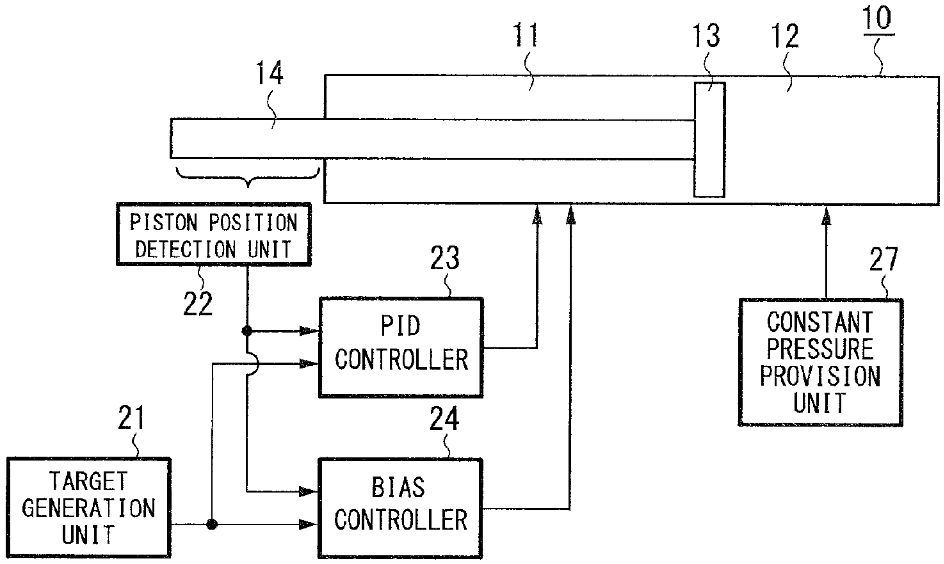
FIG. 8 is an explanatory diagram illustrating an example of control constitution according to the second embodiment of the present invention.

Next, the second embodiment of the present invention will be described referring to FIG. 8. In FIG. 8, parts corresponding to those in FIG. 1 through FIG. 7 described with respect to the first embodiment are denoted by the same reference symbols, and detailed description thereof is omitted.

Basic control conditions in the present embodiment are made such that PID control and bias pressure control are both carried out as described with respect to the first embodiment, and the concrete control method thereof is also the same as the one in the example described using respective mathematical expressions.

In the present embodiment, the point that when driving a piston in the air cylinder 10, it is controlled by a pair of the PID controller 23 and the bias controller 24 provided as control devices is the same as in the example of FIG. 2, however, outputting of the PID controller 23 and the bias controller 24 carries out only control of the pressure in the chamber on the thrusting side (in the example of FIG. 8, the first chamber 11), and the pressure in the chamber on the resisting side is made constant.

That is, as illustrated in FIG. 8, the pressure within the chamber 11 on the thrusting side is controlled based on the output of the PID controller 23 and the bias controller 24. And, the pressure in the chamber 12 on the resisting side is controlled by an output of a constant pressure provision unit 27. A constant pressure value given by the constant pressure provision unit 27 is at least made so as to be close to the bias pressure given by the bias controller 24. For example, as the constant pressure value given by the constant pressure provision unit 27, a criterion bias pressure which will be set by the fixed bias setting unit 69 in the previously-described bias controller 24 may be set.

Thus, on the thrusting side, PID control and bias pressure control are carried out, and on the resisting side, bias pressure control is carried out.

Satisfactory control becomes possible with the constitution illustrated in FIG. 8 also.

Figure 9:
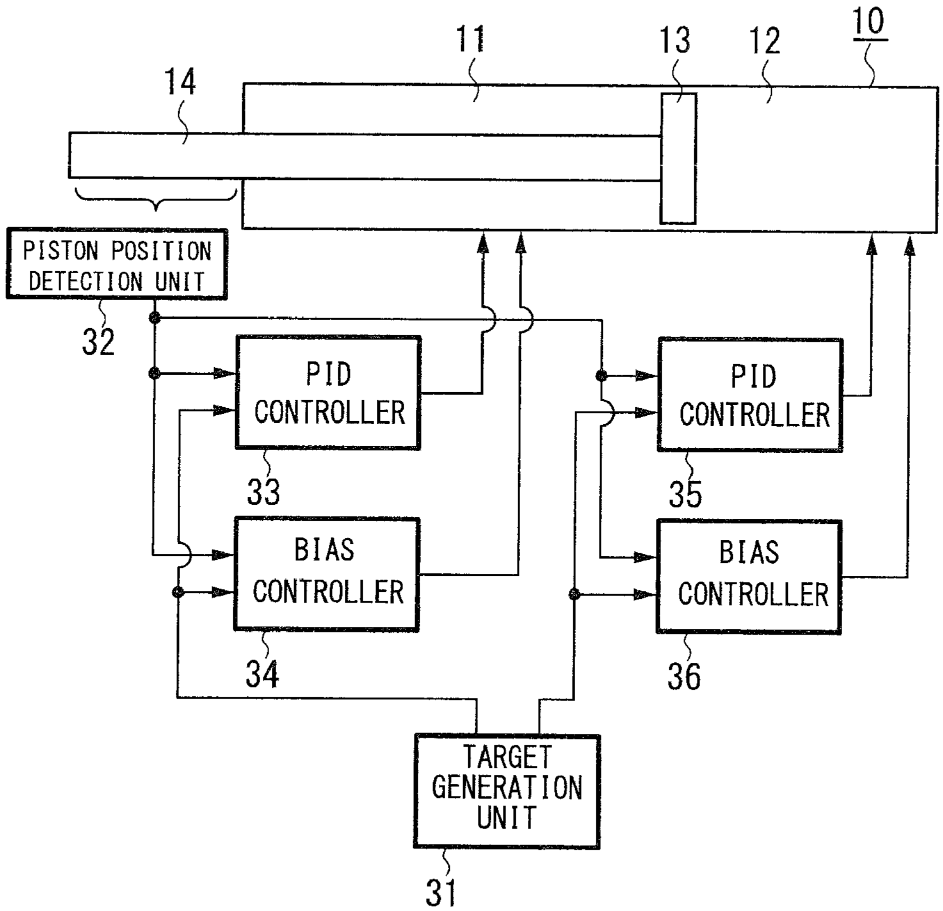
FIG. 9 is an explanatory diagram illustrating an example of control constitution according to the third embodiment of the present invention.

Next, description is made with respect to the third embodiment of the present invention referring to FIG. 9. In FIG. 9 also, parts corresponding to those in FIG. 1 through FIG. 7 described with reference to the first embodiment are denoted by the same reference symbols, and detailed description thereof is omitted.

Basic control conditions in the present embodiment are made such that PID control and bias pressure control are both carried out as described with respect to the first embodiment, and the concrete control method thereof is also the same as the one in the example described using respective mathematical expressions.

In the above-described first embodiment, as illustrated in FIG. 2, it has been constituted such that when driving a piston in the air cylinder 10, PID control and bias pressure control are both carried out only for the chamber 11 on the thrusting side, and with respect to the chamber 12 on the resisting side, pressure corresponding to constant bias pressure is given, however, in the present embodiment, as illustrated in FIG. 9, on both the thrusting side and the resisting side, control devices for carrying out PID control and bias pressure control based on respective optimum gain values are provided.

That is, as illustrated in FIG. 9, as control devices for controlling the pressure in the chamber 11 on the thrusting side, a PID controller 33 and a bias controller 34 are provided. Also, as control devices for controlling the pressure in the chamber 12 on the resisting side, a PID controller 35 and a bias controller 36 are provided. Target piston positions generated by a target generation unit 31 and detected piston positions detected by a piston position detection unit 33 are provided to the controllers 33, 34, 35, 36.

Thus, PID control and bias pressure control are carried out on the thrusting side and the resisting side, respectively. The PID controllers 33, 35 are each configured as illustrated in FIG. 3, and add together values obtained by individually multiplying a distance difference between a target position and a detected position of a piston with a proportional gain, an integral gain, and a differential gain, and carry out control based on a resulting addition value. The bias controllers 34, 36 are each configured as illustrated in FIG. 4, and add or subtract values obtained by individually multiplying a distance difference between a target position and a detected position of a piston with a proportional gain and a differential gain to and from a criterion bias pressure to calculate bias pressure, and carry out control based on a calculated value.

Note that if the direction in which the piston moves is reversed, the controllers 33, 34 on the thrusting side become controllers on the resisting side, and the controllers 35, 36 on the resisting side become controllers on the thrusting side.

With the constitution illustrated in FIG. 9 also, satisfactory control becomes possible.

Figure 10:
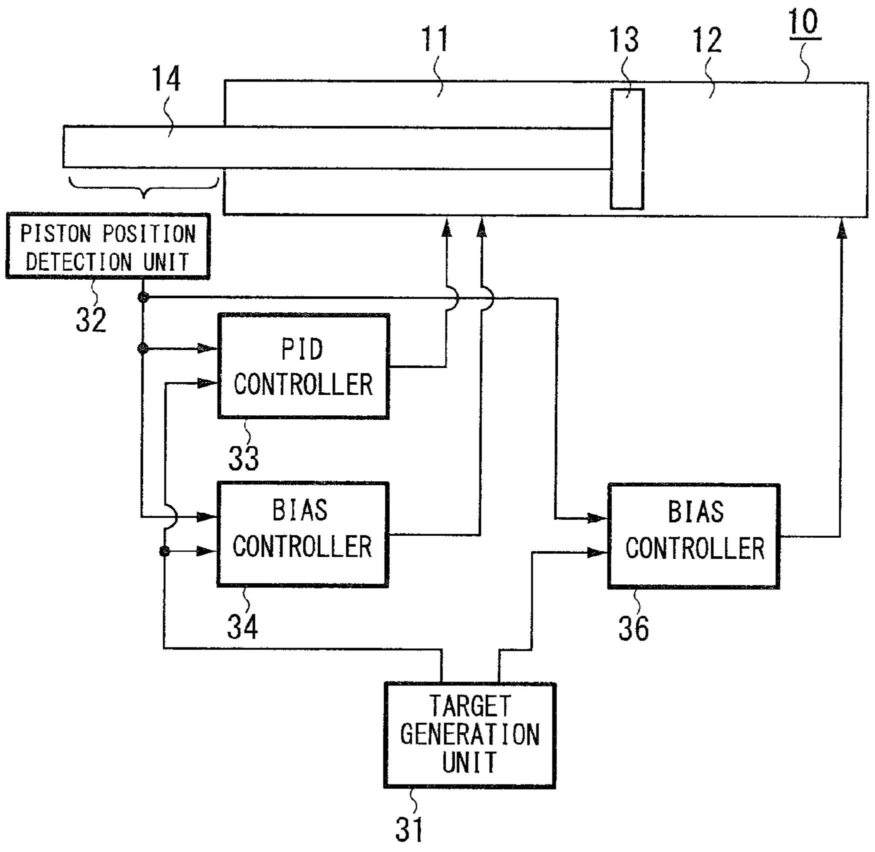
FIG. 10 is an explanatory diagram illustrating an example of control constitution according to the fourth embodiment of the present invention.

Next, description is made with respect to the fourth embodiment referring to FIG. 10. In FIG. 10 also, parts corresponding to those in FIG. 1 through FIG. 7 described with reference to the first embodiment are denoted by the same reference symbols, and detailed description thereof is omitted.

Basic control conditions in the present embodiment are made such that PID control and bias pressure control are both carried out as described with respect to the first embodiment, and the concrete control method thereof is also the same as the one in the example described using respective mathematical expressions.

In the above-described first embodiment, as illustrated in FIG. 2, it has been configured such that when driving a piston in the air cylinder 10, a common bias controller is used for the chamber 11 on the thrusting side and the chamber 12 on the resisting side, however, in the present embodiment, as illustrated in FIG. 10, it is configured such that the bias controller 34 and the bias controller 36 are individually provided for the thrusting side and the resisting side.

That is, as illustrated in FIG. 10, as control devices for controlling the pressure within the chamber 11 on the thrusting side, the PID controller 33 and the bias controller 34 are provided. Also, as a control device for controlling the pressure within the chamber 12 on the resisting side, the bias controller 36 is provided. To each of the controllers 33, 34, 36, target piston positions generated by the target generation unit 31 and detected piston positions detected by the piston position detect unit 32 are supplied.

Thus, PID control and bias pressure control are carried out on the thrusting side, and on the resisting side, bias pressure control is carried out. The PID controller 33 is configured as illustrated in FIG. 3, and adds together values obtained by individually multiplying a distance difference between a target position and a detected position of a piston with a proportional gain, an integral gain, and a differential gain, and control is carried out with a resulting addition value. The bias controllers 34, 36 are each configured as illustrated in FIG. 4, and add or subtract values obtained by individually multiplying a distance difference between a target position and a detected position of a piston with a proportional gain and a differential gain to and from the criterion bias pressure to calculate bias pressure, and control is carried out with a resulting calculation value.

Note that if the direction in which the piston moves is reversed, the controllers 33, 34 on the thrusting side become controllers on the resisting side, and the controller 36 on the resisting side becomes a controller on the thrusting side.

As illustrated in FIG. 10, satisfactory control can be possible with such constitution also that control of one chamber is carried out with PID control and bias pressure control and control of the other chamber is carried out with bias pressure control.

Note that in each of the above-described embodiments, description has been made taking as an example an air cylinder using air for the fluid in the cylinder, however, similar control may be carried out by controlling pressure in a cylinder using other fluid. Also, values indicated for respective characteristics are only preferred examples, and it is not limited to the described values.

Also, in each of the above-described embodiments, description has been made with respect to an example that a dedicated control device is constituted for each controller for carrying out control of fluid in a cylinder, however, similar constitution may be realized by constituting each controller by a computer which issues control instructions to valves, and by loading a computer program (software) for executing processing steps corresponding to each control processing described in each of the above-described embodiments in the computer. The program in this case may be distributed through various media or downloaded through some sort of communication path.

EXPLANATION OF SYMBOLS

10: Air cylinder
11: First chamber
12: Second chamber
13: Piston
14: Piston rod
21: Target generation unit
22: Piston position detection unit
23: PID controller
24: Bias controller
27: Constant pressure provision unit
31: Target generation unit
32: Piston position detection unit
33: PID controller
34: Bias controller
35: PID controller
36: Bias controller
41: First control valve
42: First discharge valve
43: Second control valve
44: Second discharge valve
51: Target value input unit
52: Detection value input unit
53: Control value output unit
54: Subtractor
55: Integrator
56: Integral gain multiplier
57: Proportional gain multiplier
58: Differentiator
59: Differential gain multiplier
60: Adder
61: Target value input unit
62: Detection value input unit
63: Control value input unit
64: Proportional gain multiplier
65: Differentiator
66: Differential gain multiplier
67: Adder
68: Maximum bias setting unit
69: Fixed bias setting unit
70: Subtractor

The invention claimed is:

1. An actuator having a piston slidably arranged in a cylinder and dividing the cylinder into a first chamber and a second chamber, and controlling pressures of gaseous or liquid fluids in the first and second chambers to control a position of the piston in a sliding direction while changing bias pressure common to the gaseous or liquid fluids in the first and the second chambers to change rigidity caused to the piston by the bias pressure, the actuator comprising:

first and second control valves arranged between a fluid pressure source and the first and second chambers and configured to adjust fluid pressure supply to the first and second chambers in a non-step manner;

first and second discharge valves configured to allow the fluid in the first and second chambers to flow in a discharge direction from the first and second chambers toward the atmosphere or low pressure source side;

a first control device carrying out feedback control of pressure to be supplied to the first or second chamber such that a difference between a target position of the piston and a detected position of the piston becomes smaller; and a second control device carrying out feedback control of bias pressure to be commonly supplied to the first and second chambers such that the difference between the target position of the piston and the detected position of the piston becomes the smallest, wherein each of the first control device and the second control device serves as a control device for controlling either one of the first control valve and the second control valve.

2. The actuator according to claim 1, wherein the second control device carries out the feedback control according to differential-preceding PD control such that a difference between a target position of the piston and a detected position of the piston becomes smaller.

3. The actuator according to claim 1, wherein when the target position of the piston is given to the first and second control devices, the first control device sets a gain enabling high responsiveness causing overshooting, and the second control device gradually increases a proportional gain in carrying out the feedback control from an initial value to negate the overshooting and adjusts the proportional gain by increasing or decreasing a differential gain in carrying out the feedback control.

4. The actuator according to claim 3, wherein an initial value of the differential gain which is set by the second control device is about 1/100 of the initial value of the proportional gain which is set by the second control device.

5. The actuator according to claim 1, wherein either one of the first control valve and the second control valve is controlled by the first control device, and both of the first control valve and the second control valve are controlled by the second control device.

6. The actuator according to claim 1, wherein either one of the first control valve and the second control valve is controlled by the first control device and the second control device, and the other one of the first control valve and the second control valve is controlled such that predetermined pressure is given to a corresponding one of the first and second chambers.

7. The actuator according to claim 1, wherein when either one of the first control valve and the second control valve is controlled by the first control device and the other one of the first control valve and the second control valve is controlled by the second control device, individually set gains for feedback control are used.

8. The actuator according to claim 1, wherein both the first control device and the second control device are individually provided for controlling the first control valve and the second control valve, and control is carried out using the gains for feedback control.

9. A method of controlling an actuator having a piston slidably arranged in a cylinder and dividing the cylinder into a first chamber and a second chamber, the method controlling pressure of gaseous or liquid fluid in the first and second chambers to control a position of the piston in a sliding direction while changing bias pressure common to the gaseous or liquid fluids in the first and the second chambers to change rigidity caused to the piston by the bias pressure, the actuator comprising first and second control valves arranged between a fluid pressure source and the first and second chambers and configured to adjust fluid pressure supply to the first and second chambers in a non-step manner; and first and second discharge valves configured to allow the fluid in the first and second chambers to flow in a discharge direction from the first and second chambers toward the atmosphere or low pressure source side, and the method comprising steps of:

carrying out feedback control of pressure to be supplied to the first or second chamber such that that a difference between a target position of the piston and a detected position of the piston becomes smaller; and carrying out feedback control of bias pressure to be commonly supplied to the first and second chambers such that the difference between the target position of the piston and the detected position of the piston becomes the smallest, wherein each of the steps of feedback control serves as controlling either one of the first control valve and the second control valve.

10. A computer program which stores computer program instructions which when executed by a computer performs steps of a method of controlling an actuator having a piston slidably arranged in a cylinder and dividing the cylinder into a first chamber and a second chamber, the method controlling pressure of gaseous or liquid fluid in the first and second chambers to control a position of the piston in a sliding direction while changing bias pressure common to the gaseous or liquid fluids in the first and the second chambers to change rigidity caused to the piston by the bias pressure, the actuator comprising first and second control valves arranged between a fluid pressure source and the first and second chambers and configured to adjust fluid pressure supply to the first and second chambers in a non-step manner;

and first and second discharge valves configured to allow the fluid in the first and second chambers to flow in a discharge direction from the first and second chambers toward the atmosphere or low pressure source side, and the method comprising steps of:

carrying out feedback control of pressure to be supplied to the first or second chamber such that that a difference between a target position of the piston and a detected position of the piston becomes smaller; and carrying out feedback control of bias pressure to be commonly supplied to the first and second chambers such that the difference between the target position of the piston and the detected position of the piston becomes the smallest, wherein each of the steps of feedback control serves as controlling either one of the first control valve and the second control valve.

* * * * *